(12) United States Patent
Thornton et al.

(10) Patent No.: US 7,970,444 B2
(45) Date of Patent: Jun. 28, 2011

(54) PIVOTING MOBILE TERMINAL

(75) Inventors: Curtis W. Thornton, Raleigh, NC (US); Gerard James Hayes, Wake Forest, NC (US); Ronald A. Louks, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1153 days.

(21) Appl. No.: 11/679,966

(22) Filed: Feb. 28, 2007

(65) Prior Publication Data

US 2008/0207272 A1    Aug. 28, 2008

(51) Int. Cl.
 *H04M 1/00*    (2006.01)
(52) U.S. Cl. ............... 455/575.4; 455/90.3; 455/575.1; 379/433.12; 379/433.13; 379/433.05
(58) Field of Classification Search ............ 455/575.4, 455/575.1, 575.3, 575.6, 575.8, 90.3; 379/433.01, 379/433.04, 433.05, 433.1, 433.11, 433.12, 379/433.13
See application file for complete search history.

(56) References Cited

U.S. PATENT DOCUMENTS

| | | | |
|---|---|---|---|
| 6,665,173 B2 | 12/2003 | Brandenberg et al. | |
| 7,016,182 B2 | 3/2006 | Brandenberg et al. | |
| 7,092,747 B2 * | 8/2006 | Park et al. | 455/575.4 |
| 7,142,420 B2 | 11/2006 | Santos et al. | |
| 7,280,857 B2 * | 10/2007 | Geernaert | 455/575.4 |
| 7,577,466 B2 * | 8/2009 | Kim | 455/575.4 |
| 7,636,591 B2 * | 12/2009 | Kim et al. | 455/575.4 |
| 7,778,663 B2 * | 8/2010 | Bong Doo | 455/556.1 |
| 7,881,758 B2 * | 2/2011 | Nagamine et al. | 455/575.1 |
| 2004/0137940 A1 * | 7/2004 | Matsunami | 455/550.1 |
| 2006/0025184 A1 * | 2/2006 | Cho et al. | 455/575.4 |
| 2006/0030381 A1 * | 2/2006 | Byun et al. | 455/575.4 |
| 2006/0046796 A1 | 3/2006 | Park et al. | |
| 2006/0061943 A1 | 3/2006 | Santos et al. | |
| 2006/0135228 A1 * | 6/2006 | Kato | 455/575.4 |
| 2006/0146014 A1 | 7/2006 | Lehtonen | |
| 2007/0093281 A1 * | 4/2007 | Park et al. | 455/575.4 |
| 2007/0142101 A1 * | 6/2007 | Seshagiri et al. | 455/575.4 |
| 2007/0254730 A1 * | 11/2007 | Kim et al. | 455/575.4 |

(Continued)

FOREIGN PATENT DOCUMENTS

EP    1 592 209 A2    11/2005

(Continued)

OTHER PUBLICATIONS

"Samsung SPH-B5200 Gaming Phone", http://www.techeblog.com/indpex.php/tech-gadget/samsung-sph-b5200-gaming phone, Mar. 14, 2006, pp. 1-5.

(Continued)

*Primary Examiner* — RuiMeng Hu
(74) *Attorney, Agent, or Firm* — R. Brian Drozd; Moore & Van Allen

(57) ABSTRACT

A mobile terminal has a first body, a second body and a connector. The connector includes a ring assembly that is fixed to the second body and rotatably and slidably connected to the first body. The first body is capable of slidably moving along the ring assembly along a longitudinal axis relative to the second body. Additionally, the first body is capable of slidably moving along the ring assembly along the lateral axis relative to the second body, and the first body is further capable of rotatably moving about the ring assembly relative to the second body while maintaining electrical communication with the second body.

34 Claims, 12 Drawing Sheets

U.S. PATENT DOCUMENTS

| | | | |
|---|---|---|---|
| 2008/0004083 A1* | 1/2008 | Ohki et al. | 455/566 |
| 2009/0209305 A1* | 8/2009 | Lee et al. | 455/575.4 |
| 2009/0298560 A1* | 12/2009 | Saitoh | 455/575.4 |

FOREIGN PATENT DOCUMENTS

| | | |
|---|---|---|
| EP | 1 594 289 A2 | 11/2005 |
| EP | 1 821 500 A2 | 8/2007 |
| EP | 1 834 470 | 9/2007 |
| WO | 2004057843 A1 | 7/2004 |
| WO | 2005071928 A1 | 8/2005 |
| WO | 2006/014088 A | 2/2006 |
| WO | 2006/038499 A1 | 4/2006 |
| WO | 2006/041238 A | 4/2006 |

OTHER PUBLICATIONS

Sony Ericsson Mobile Communications AB, International Patent Application No. PCT/US2008/052769; International Search Report and Written Opinion, dated Jul. 10, 2008.

Sony Ericsson Mobile Communications AB, International Patent Application No. PCT/US2006/061107, International Search Report and Written Opinion, dated Feb. 18, 2008.

Sony Ericsson Mobile Communications AB, International Patent Application No. PCT/US2006/061107, International Preliminary Report on Patentability, dated Jul. 24, 2008.

* cited by examiner

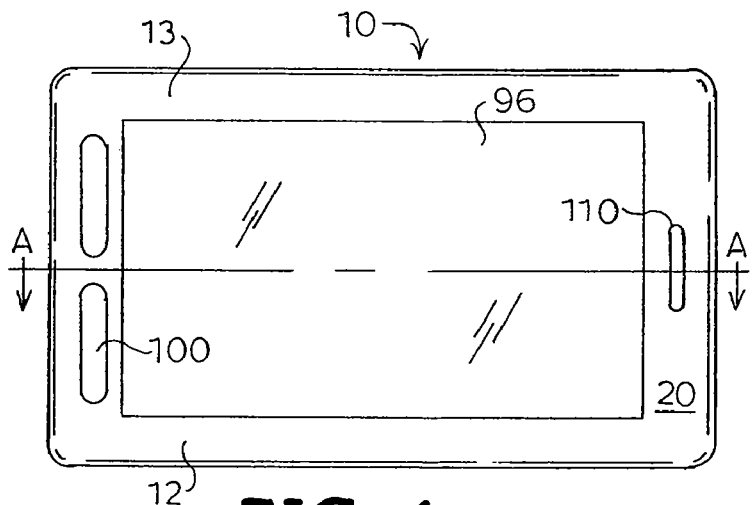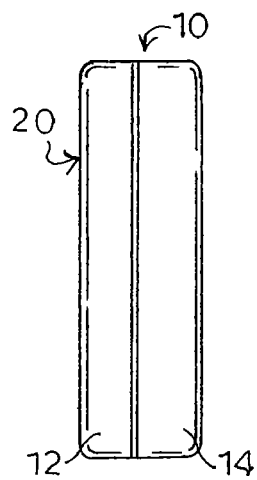
FIG. 1  FIG. 2
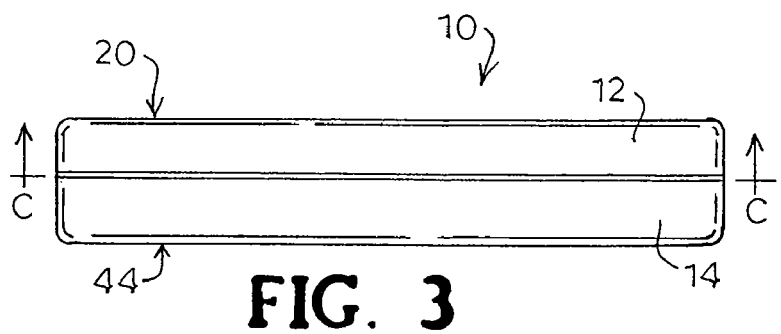
FIG. 3

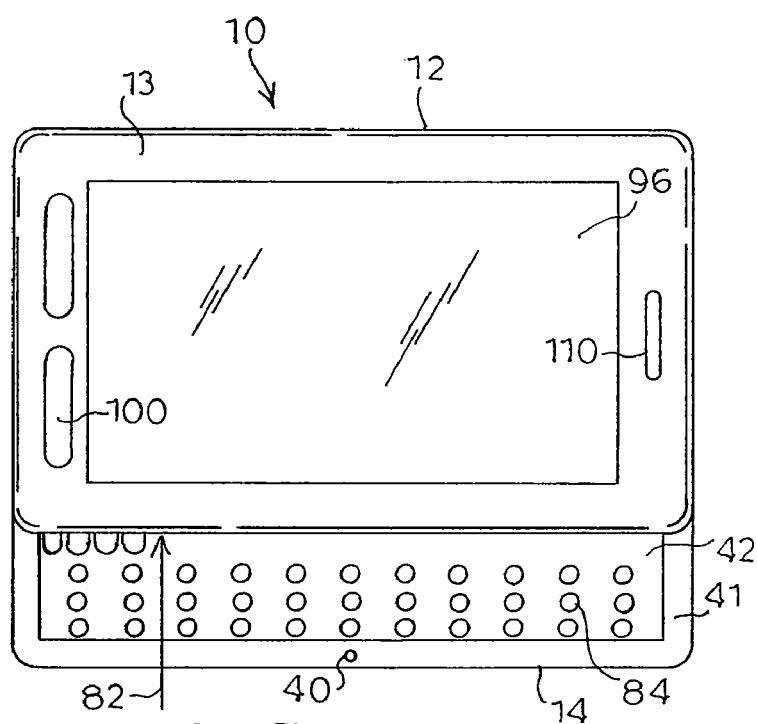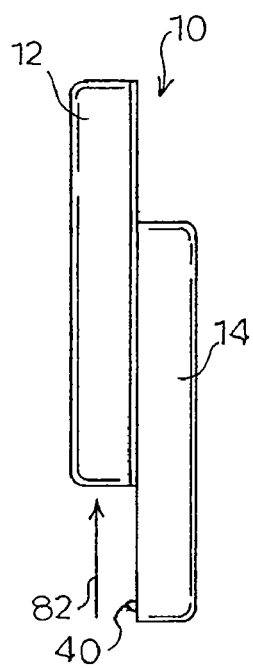
FIG. 17  FIG. 18
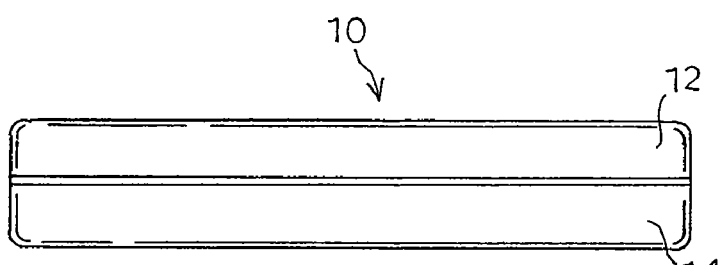
FIG. 19

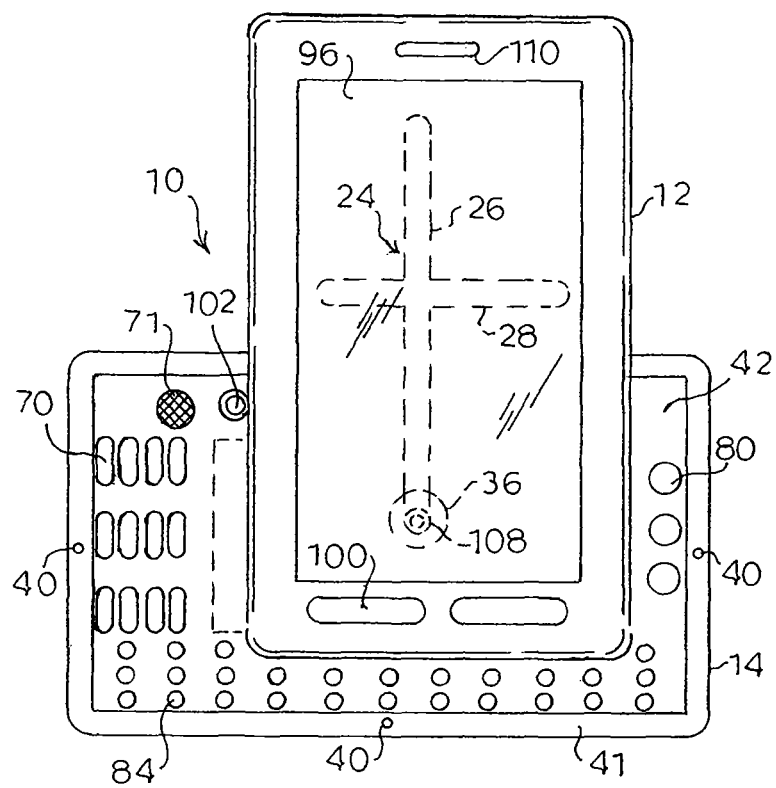
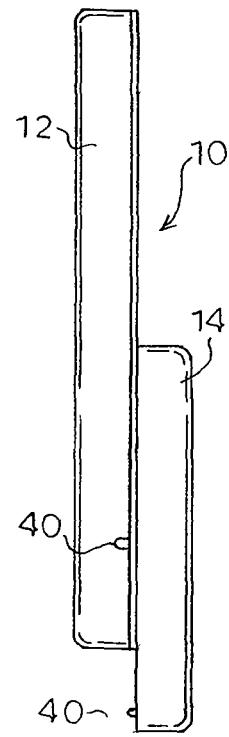
FIG. 27   FIG. 28
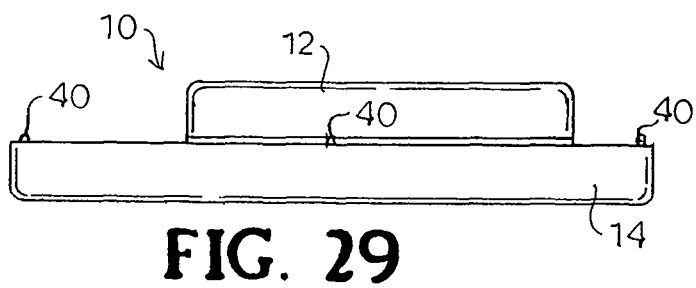
FIG. 29

PIVOTING MOBILE TERMINAL

BACKGROUND

Mobile terminals are used today by a significant number of people. In addition, with advances made in circuit design and battery life, the size and weight of mobile terminals has decreased over the lifetime of this product.

Because of the size and weight limitations, designers of such devices have difficulty including as many desired features in any one device. For example, with respect to a device for use as a cellular telephone, it is a challenge to include in that device any additional features that would enable the user to operate the device as something else, such as a personal digital assistant (PDA). This is due in part to the fact that a cellular telephone requires the use of a numeric keypad, while a PDA uses an alphanumeric keypad. To include both in one device requires miniaturization of parts and design. Thus there is a balance in providing as many advantageous features consumers want on a device, with the size and weight of the device so that it is not overly bulky or heavy. Often a compromise is made on the selection of some features in an effort to maintain a small, light weight design. Thus, the user is limited in the number of ways in which the device may be used.

Mobile terminals, such as cellular phones and personal digital assistants (PDAs), feature a variety of housing configurations. There are, for example, flip designs, "jack-knife" designs, and "candy bar" designs. Flip designs may include a flip portion mounted to an end of a housing with one or more hinges along the end of the housing. The operative faces of the flip and housing oppose each other when the flip is closed and are exposed when the flip is open. Jack-knife designs may include two housings, where one housing is rotatably mounted to the other housing with a pin-type connection made across the thickness of the housings, disposed at one end of the terminal when the housings are in the closed position. The operative face of one housing is always exposed, while the operative face of the other housing is hidden when the terminal is closed and is exposed when the terminal is open. Candy bar designs include a single housing, and are elongated, suggestive of a candy bar shape. However, with planar housings, the key pads are always exposed and may be activated accidentally. Also exposed keypads may wear out prematurely rendering the terminal unusable.

With respect to hinged and rotating designs, there is a challenge in ensuring that all the electrical contacts and power are provided throughout the housing to ensure effective operation of the device. For example, if the wiring does not have sufficient flexibility to move freely when the flip phone is flipped open, the wires will not allow the device to work properly or power may not be distributed to both sides of the terminal device and therefore render the device inoperative.

Many mobile terminals currently include full "qwerty" keypads, with numeric keys hidden within the keypad and accessible for use by depressing a function key first. Such a design reduces the number of keys required, but may make it difficult to identify and use the numeric keys. Most mobile terminals that include such keypads do so with the substantially planar, single housing design, and have the keypad and display on the same operative face of the housing. Incorporating a display and a keypad into the same face, however, results in a screen size substantially smaller than the face, possibly with keys too small to easily use with one's fingers. Many terminals with full keypads also do not have the form factor of a phone that users are accustomed to and may prefer.

It is a challenge to designers of mobile terminals to design a terminal that is of sufficient size to enable the user to operate the keys on the keypads effectively, yet make the device small enough so that it is easily mobile and may be carried in a pocket or handbag. In addition, because of the size limitations, there is a challenge to find sufficient space on the terminal body to provide the user with as many features as possible for the user to incorporate into the mobile device, while maintaining ease of portability. Also, where the terminal configurations are made of more than one part and move relative to each other. There is a further challenge to ensure that the wiring of the device is not compromised during movement and that current and power are properly distributed during operation of the device.

SUMMARY OF THE INVENTION

In accordance with one embodiment of the present invention a mobile terminal is provided. The terminal has a first body having a first upper surface and a first lower surface, and having a longitudinal axis and a lateral axis; a second body having a second upper surface and a second lower surface; and a connector fixed to the second body and rotatably and slidably connected to the first body. The first body is capable of slidably moving along its longitudinal or lateral axis relative to the second body or rotatably moving relative to the second body, while maintaining electrical communication with the second body.

In accordance to a second embodiment of the present invention, a mobile terminal is provided having a first body having a first upper surface and first lower surface, a slot located on the first lower surface, the slot having a longitudinal component and a lateral component, the longitudinal and lateral components being relatively perpendicular to each other. The second embodiment further provides for a second body having a second upper and a second lower surface. The second embodiment further includes a connector fixed to the second body and slidably received into the slot in the first body for slidable and pivotable engagement with the first body. The connector has a hollow central core. The second embodiment further includes electrical wires connected at a first end to the first body and at a second end to the second body. The electrical wires pass through the hollow central core of the connector. The second embodiment further includes a pair of spaced apart longitudinal grooves and a pair of space apart lateral grooves. The grooves are located on the first lower surface. Each groove has a groove length, a first groove endpoint, a second groove endpoint, and at least one recess along the groove length. The groove endpoints and functional recesses are made of an electrically conductive material, and the remaining length of the groove is made of a non-conductive material. The second embodiment of the present invention further includes at least one spring loaded pin mounted on the second upper surface. The pin is slidably and removably engaged in at least one groove. The pin is made of an electrically conductive material. The second embodiment further includes a terminal communication means for receiving electrical signals and sending electrical signals within the device. When the first body of the second embodiment, moves relative to the second body, at least one pin moves from a first position within the groove to a second position at a groove recess or at a groove endpoint. Such movement causes the pin to make contact with the electrically conductive groove material at the groove recess or groove endpoint. Such contact creates an electrical signal that is sent to the terminal communication means regarding the function to be adopted by the terminal in the assumed position.

A third embodiment of the present invention includes a mobile terminal having a first body having a first upper surface and first lower surface, the first upper surface having a screen thereon, the first lower surface having a camera lens thereon. The third embodiment further includes a slot located on the first lower surface, the slot having a longitudinal component and a lateral component, the longitudinal and lateral components being relatively perpendicular to each other. The third embodiment further includes a second body having a second upper and a second lower surface, the second upper surface having an alphanumeric keypad, a numeric keypad, a camera lens, a touch screen, and at least one pin recess thereon. The third embodiment also includes a connector fixed to the second body and slidably and rotatably received into the slot in the first body for slidable and pivotable engagement therewith. The connector has a hollow central core. The third embodiment further includes electrical wires connected at a first end to the first body and at a second end to the second body. The electrical wires pass through the hollow central core of the connector. The third embodiment further includes a pair of spaced apart longitudinal grooves and a pair of spaced apart lateral grooves. The grooves are located on the first lower surface and each have a groove length, a first groove endpoint, a second groove endpoint, and at least one recess along the groove length. The groove endpoints and recess are made of an electrically conductive material, and the remaining length of the groove is made of a non-conductive material. The third embodiment also includes at least one spring loaded pin mounted on the second upper surface. The pin is slidably and removably engaged in at least one groove, and made of an electrically conductive material. When the first body slides or pivots relative to the second body, at least one pin moves from a first position within the groove to a second position at a groove recess, a pin recess or at a groove endpoint, the contact of the pin with the electrically conductive groove material at the groove recess or groove endpoint, or pin recess, creates an electrical signal that communicates within the terminal to indicate the function to be adopted by the terminal in the assumed position of the terminal.

An alternative embodiment of the present invention is a particular configuration of the third embodiment. This occurs when the first body slides relative to the second body in the longitudinal slot in a first direction, at least one pin moves from a first endpoint on the longitudinal groove to a first groove recess, and the numeric keypad on the second surface is exposed, signaling to the terminal to assume the function of a cellular telephone.

A second configuration of the third embodiment occurs when the first body slides relative to the second body in the longitudinal slot in a second direction, at least one pin moves from a second endpoint on the longitudinal groove to a groove recess signaling to the terminal to assume the function of a digital camera, such longitudinal movement exposes the camera lens on the lower first surface and the function buttons on the upper second surface, and activates the screen on the upper first surface as a camera viewfinder.

A fourth configuration of the third embodiment occurs when the first body slides relative to the second body in the lateral slot in a first direction, at least one pin moves from a first endpoint on the lateral groove to a groove recess signaling to the terminal to assume the function of a personal digital assistant, such lateral movement exposes the alphanumeric keypad on the upper second surface, and activates the screen on the upper first surface as a touch screen.

A fifth configuration of the third embodiment occurs when the first body slides relative to the second body in the lateral slot in a second direction, at least one pin moves from a second endpoint on the lateral groove to a groove recess signaling to the terminal to assume the function of a global positioning system, such lateral movement exposes the function buttons on the upper second surface, and activates the screen on the upper first surface.

A sixth configuration of the third embodiment occurs when the first body pivots relative to the second body about the connector and then the first body is slid relative to the second body along a portion of the length of the first body, at least one pin moves from a first position within a lateral or longitudinal groove to a second position received within the pin recess, signaling to the terminal to assume the function of a cellular video teleconferencing device, and such pivotal and longitudinal sliding expose the alphanumeric keypad, camera lens and touch screen on the second upper surface and activate the screen on the upper first surface.

Features and advantages of the present invention will become more apparent in light of the following detailed description of some embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF DRAWINGS

FIG. 1 is a top view of an embodiment of a pivoting mobile terminal according to the present invention, in a first closed position.

FIG. 2 is a side view of the mobile terminal of FIG. 1.

FIG. 3 is a front view of the mobile terminal of FIG. 1.

FIG. 17 is a top view of the mobile terminal of FIG. 16.

FIG. 18 is a side view of the mobile terminal of FIG. 16.

FIG. 19 is a front view of the mobile terminal of FIG. 16.

FIG. 27 is a top view of the embodiment of FIG. 1 with the first body pivoted relative to the second body and slid longitudinally relative to the second body into a seventh position.

FIG. 28 is a side view of the mobile terminal of FIG. 27.

FIG. 29 is a front view of the mobile terminal of FIG. 27.

DETAILED DESCRIPTION OF THE INVENTION

Certain terminology is used herein for convenience only and is not to be taken as a limitation on the invention. For example, words such as "top," "bottom," "upper," "lower," "horizontal," "vertical," "inner," "outer," "upward," and "downward" merely describe the configuration shown in the figures. It is understood that the components may be oriented in any direction and the terminology, therefore, should be understood as encompassing such variations unless specified otherwise.

As used herein, the term "mobile terminal" may include, among other things: a palmtop receiver or other appliance; a cellular radiotelephone with or without a multi-line display and with or without digital camera capability; a hand held phone; a Personal Communications System (PCS) terminal that may combine a cellular radiotelephone with data processing, facsimile and data communications capabilities and digital camera capabilities; a personal digital assistant (PDA) that can include a radiotelephone, pager, Internet/intranet access, Web browser, organizer, calendar and/or a global positioning system (GPS) receiver; a calculator; a handheld game or controller; and a personal music playback system such as for CDs, minidisks, MP-3 files, memory sticks, or the like. In addition, the mobile terminal may include touch screens thereon for use with a stylus or with fingers.

Figure 4:
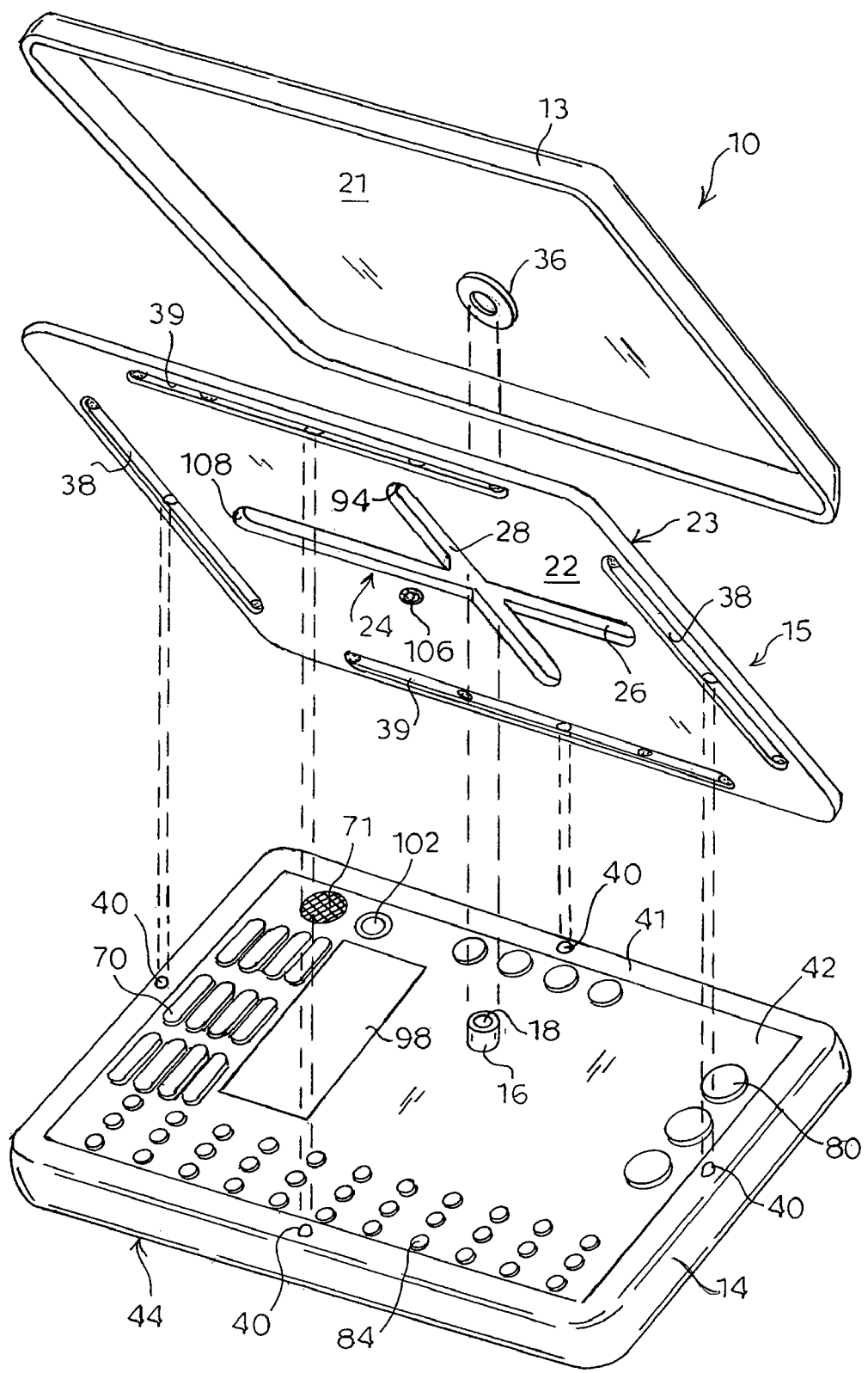
FIG. 4 is an exploded perspective view of the pivoting mobile terminal of FIG. 1.

Referring now to the drawings in which like numerals indicate like parts throughout, a first embodiment of the present invention is shown in FIG. 1. FIG. 1 shows the first embodiment of the present invention in a closed or "home" position. The first embodiment of the present invention 10 includes a first body 12 and a second body 14. In the home position, the first body 12 and second body 14 are situated proximate to each other and aligned with each other. The first body 12 and second body 14 are connected by a ring assembly 16 there between, as shown in FIG. 4. The ring assembly 16 has a hollow center section 18 through which wires (not shown) pass. As it will be understood by one of ordinary skill in the art, the wires are connected at their first ends to various points on the first body 12 and to various points on the second body 14 at their second ends. The hollow center section 18 of the ring assembly 16 acts as a harness to protect the wires from breakage as the first body 12 and second body 14 move relative to one another via the ring assembly 16.

Figure 5:
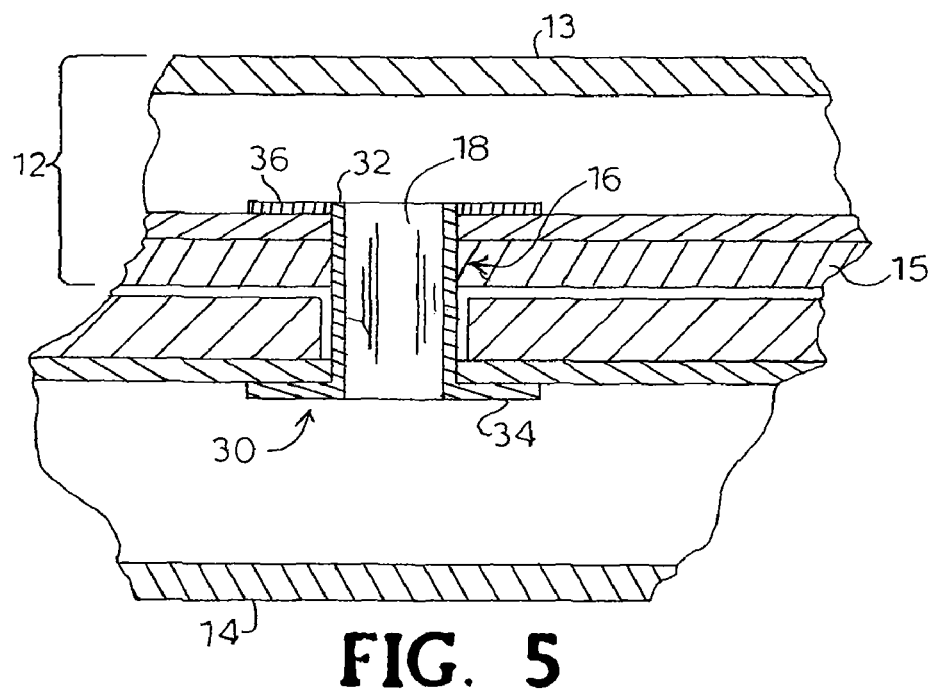
FIG. 5 is an enlarged cross-section view taken along line A-A of FIG. 1.

The first body 12 is made up of a lid 13 and a slotted member 15. The lid 13 has a first upper surface 20 and a lid lower surface 21. The slotted member 15 has a slotted upper surface 23 and a slotted lower surface 22. The slotted member 15 also has a slot 24 extending through the body of the slotted member. The slot 24 includes a longitudinal component 26 and a lateral component 28 oriented perpendicular to one another. Together, the combined lateral and longitudinal components 26, 28 provide for a "cross-shaped" slot. As shown in more detail in FIG. 5, the ring assembly 16 includes a tubular section 30 having an upper end 32 and a lower end 34. The ring assembly further includes a collar 36 fixed to the upper end 32 of the ring assembly 16.

Figure 7:
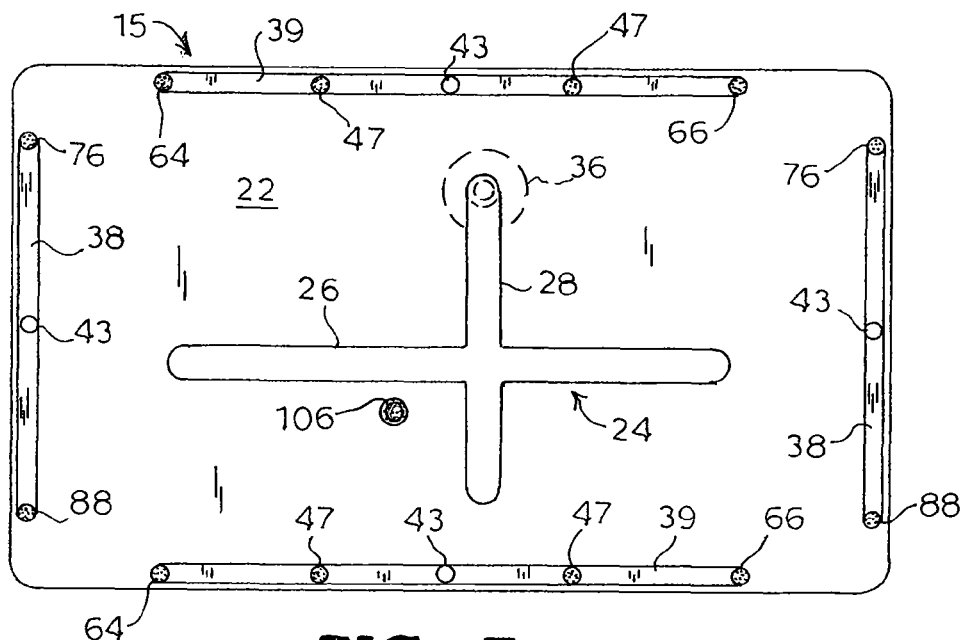
FIG. 7 is a bottom view of the sectional view taken along line C-C of FIG. 3.

Turning now to FIG. 7, the first body 12 has pair of lateral grooves 38 and a pair of longitudinal grooves 39. The lateral grooves 38 and the longitudinal grooves 39 are located on the first lower surface 22 of the slotted member 15. The lateral grooves 38 are parallel and located along the edges of the width first lower surface 22. The longitudinal grooves are parallel and located along the edges of the length of the first lower surface 22.

Figure 6:
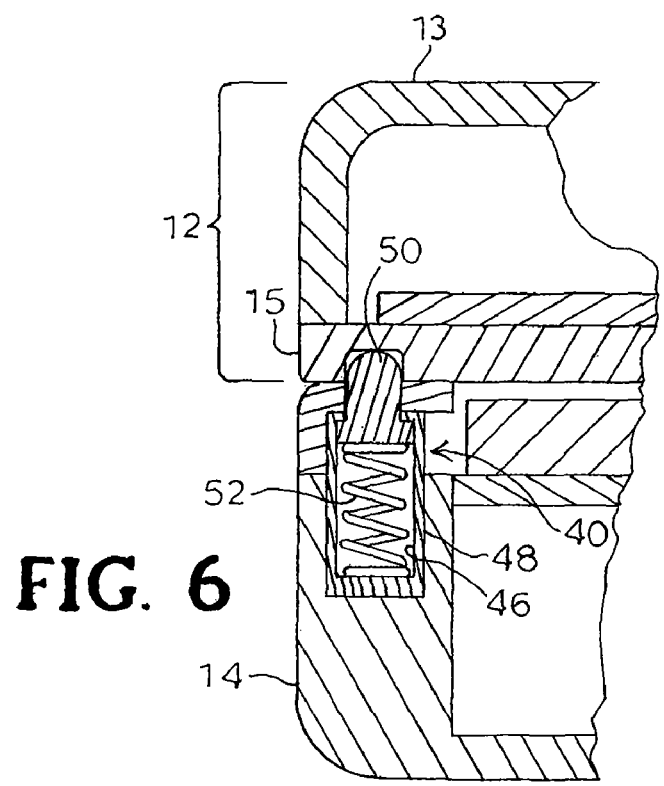
FIG. 6 is an enlarged cross-sectional view of a portion of FIG. 5.

Turning now to the second body 14 as shown in FIG. 4, the second body 14 includes a second upper surface 42 and a second lower surface 44, as shown in FIG. 3. Returning to FIG. 4, spring loaded pins 40 are mounted on the second body 14 and extend upward from the second upper surface 42. As shown in more detail in FIG. 6, the pin 40 includes an inner sleeve 46 and an outer sleeve 48. The inner and outer sleeves 46, 48 are sized so that the inner sleeve can slide along the longitudinal axis of the outer sleeve. The outer sleeve 48 has an end cap 50 that is spherical or dome-shaped. Housed within the inner sleeve is a spring 52. During installation, the pin 40 is placed within a pin recess 54 and the spring 52 is compressed in the pin 40 so that the outer sleeve 48 exerts an outward force on the end cap 50.

As assembled, as shown in FIG. 4, the pins 40 are located along the opposed edges of the upper second surface 42 and are received into the lateral 38 and longitudinal grooves 39 of the first lower surface 22 of the slotted member 15. The pins 40 are located approximately in the center of each length and width of the upper second surface 42. Turning now to FIG. 7, the lateral 38 and longitudinal 39 grooves have groove recesses 56 therein. The groove recesses 56 receive the pins 40 at particular points along the length of the lateral 38 and longitudinal grooves 39. The groove recesses are positioned along the length of the lateral 38 and longitudinal grooves 39 so that when the user is manipulating the device 10 for a particular use, the pins 40 are removably received into the groove recesses 56 which will help to keep the device in a relatively secured position. This feature will be explained in further detail below. Portions of the lateral and longitudinal grooves 38, 39 are made of electrically conductive material. Other portions of the grooves 38, 39 are made of non-conductive material. The importance of this feature will be discussed in more detail below.

Figure 8:
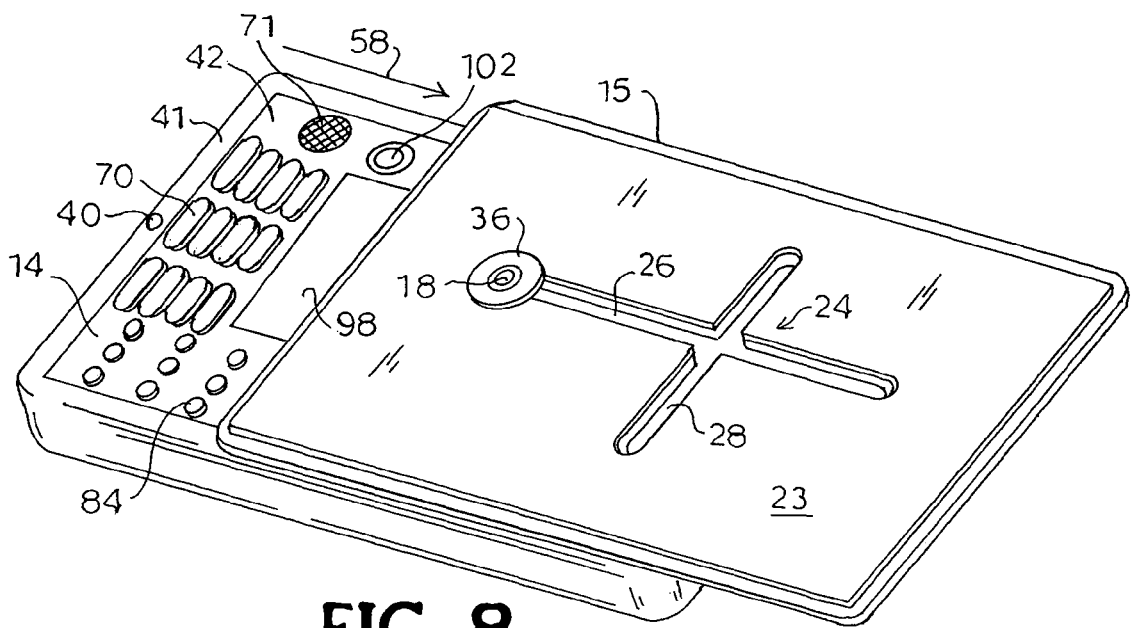
FIG. 8 is a perspective view of the embodiment of FIG. 1 with the lid removed and the first body slid longitudinally relative to the second body into a second position.
Figure 9:
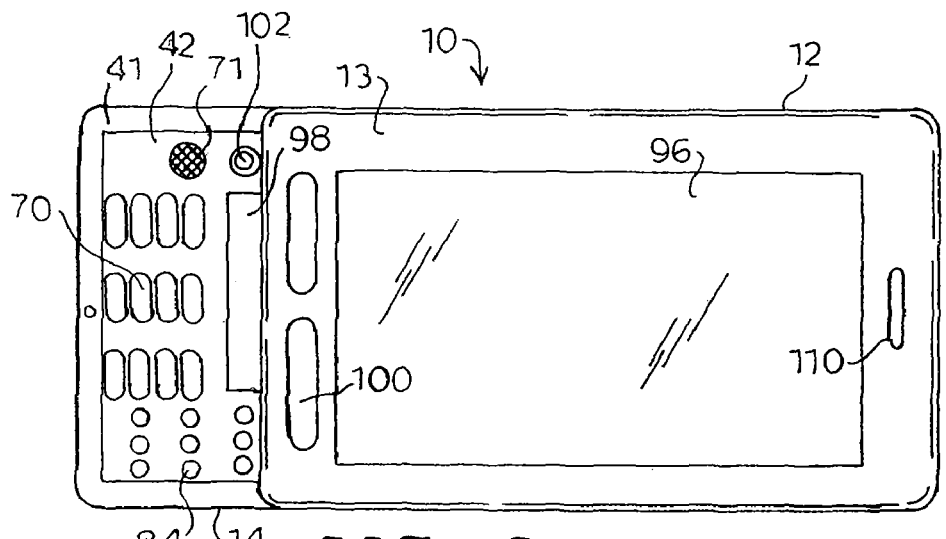
FIG. 9 is a top view of the mobile terminal of FIG. 8.
Figure 10:
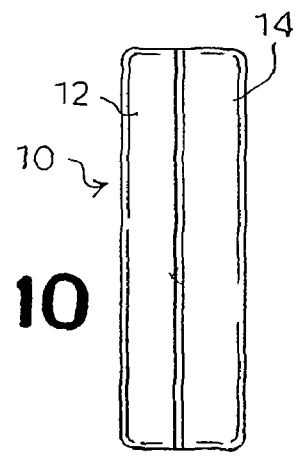
FIG. 10 is a side view of the mobile terminal of FIG. 8.
Figure 11:
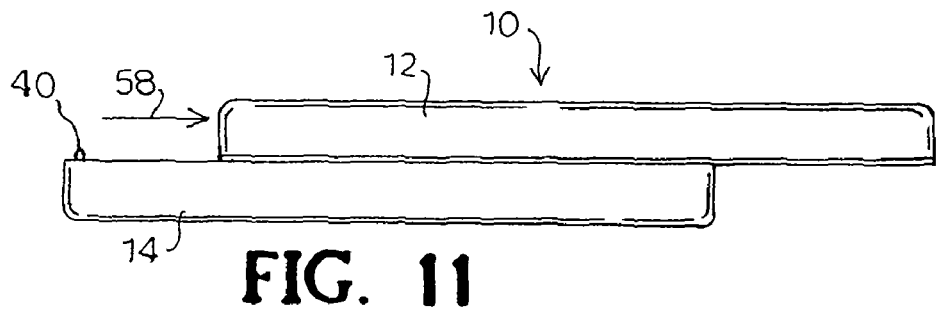
FIG. 11 is a front view of the mobile terminal of FIG. 8.
Figure 12:
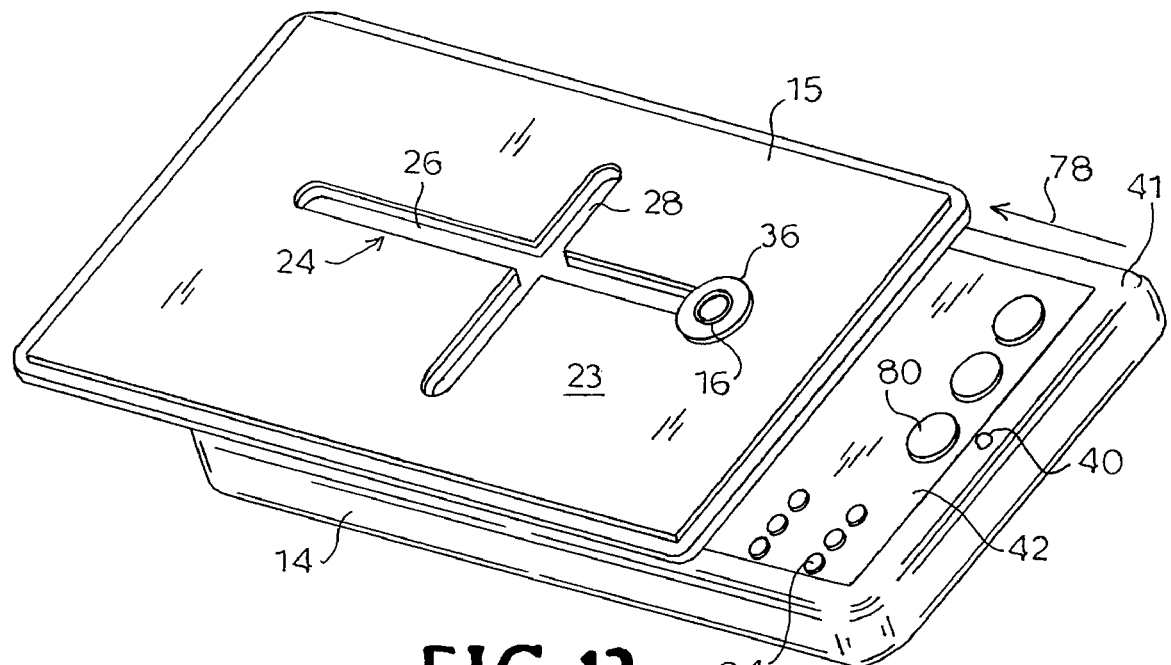
FIG. 12 is a perspective view of the embodiment of FIG. 1 with the lid removed and the first body slid longitudinally relative to the second body into a third position.

A first configuration of the invention is shown in FIGS. 8-11. FIG. 8 shows the first configuration in a perspective view. The first body 12 is slid relative to the second body 14 longitudinally along a portion of the length of longitudinal component 26 of the slot 24 as indicated by arrow 58. As force is placed on the first body 12 in the direction of arrow 58, the pins 40 move out of the home groove recesses 43 in the "home" position and travel along in their respective longitudinal grooves 39 until they reach a first longitudinal functional recess 64, shown in FIG. 7. The pins 40 on both sides of the longitudinal groove 39 recede into their respective first longitudinal functional recess 64. This enables the first body 12 to come to a removably secured position relative to the second body 14 so that the user may use the device 10 in this first configuration without the first body 12 moving relative to the second body 14.

It should be noted that the pins 40 are recessed within the lateral grooves 38 at the "home" recesses 43. When the pins are recessed, they are in an extended position. When the pins are traveling along the grooves, they are in a compressed position. As the first body 12 is moved from the home position into the first configuration, the pins 40 move out of their home recesses 43, compress as they travel along the longitudinal grooves 39 and return to an extended position as shown in FIG. 8 when the embodiment 10 is moved into its first configuration, and the pins 40 are received into the first longitudinal functional recesses 64.

In this first configuration, it is anticipated that a numeric keypad 70 and microphone 71 would be exposed so that the invention may be used in a cellular telephone capacity. To further achieve this first configuration and the other configurations discussed in more detail below, the lateral 38 and longitudinal grooves 39 are preferably made of different materials along their respective lengths. In particular, both the lateral 38 and longitudinal grooves 39 further include home recesses 43 at a midpoint position of each groove. The longitudinal grooves 39 include first longitudinal functional recesses 64 at a first position along the length of each longitudinal groove. The longitudinal groove 39 further includes a second longitudinal functional recess 66 at a second position along the length of the longitudinal groove.

The material within and immediately surrounding the first longitudinal functional recesses 64, second longitudinal functional recesses 66 and home recesses 43 is that of an electrically conductive material. The other material comprising the lateral and longitudinal grooves is made of a non-conductive material. Thus when a user moves the first body 12 relative to the second body 14 along the longitudinal grooves 39, the pins 40 move out of the home recess 43 and travel along a length of the longitudinal groove 39. During this time, the device is not electrically activated. This is done so that during the physical manipulation of the device 10, the device will not accidentally become activated and so that manipulation from one configuration to another configuration requires an electrical disconnection of the function of the device and a reconnection of the electrical power to the device in a different mode or function. In addition, by creating a signal to the device when the device has assumed a particular configuration, the various features of the devices, such as screens and function buttons, may be used in different capacities as the function of the device changes. For example, a particular set of function buttons may be used as camera buttons when the device is in one configuration but the same function buttons may be used to operate the device as a video teleconferencing device in another configuration. The details of this feature will be explained with particularity below as each configuration is described separately.

In the first configuration, during the travel along the length of the longitudinal groove 39 after the pins 40 have moved out of the home recesses 43, they move along the longitudinal grooves on non-conductive material. Then, the pins 40 encounter the first longitudinal functional recesses 64. The pins 40 are expandably received into the first longitudinal function recesses 64. As a result, the pins 40, which are made of an electrically conductive material, contact the first longitudinal function recess 64. This contact results in generating a signal within the device 10 so as to indicate to the device the function to be assumed in this first longitudinal function recess 64, as well as to distribute power to the device in this first configuration. For example, it is anticipated that as the first body 12 is moved relative to the second body 14 in the direction indicated by arrow 58, the first configuration would be a cellular telephone. Thus, the electrical contact made between the pins 40 and the first longitudinal function recesses 64 would signal to the device 10 that the device should assume the function of a cellular telephone when it is in that particular position. Thus, in this position, the upper surface of the lid 13 is a lid touch screen 96. This lid touch screen 96 would be activated and would conform to a cellular telephone screen for viewing and use by the user. In addition, in this first configuration, the numeric keypad 70 and microphone 71 are activated and ready for use as part of the cellular telephone configuration.

Figure 15A:
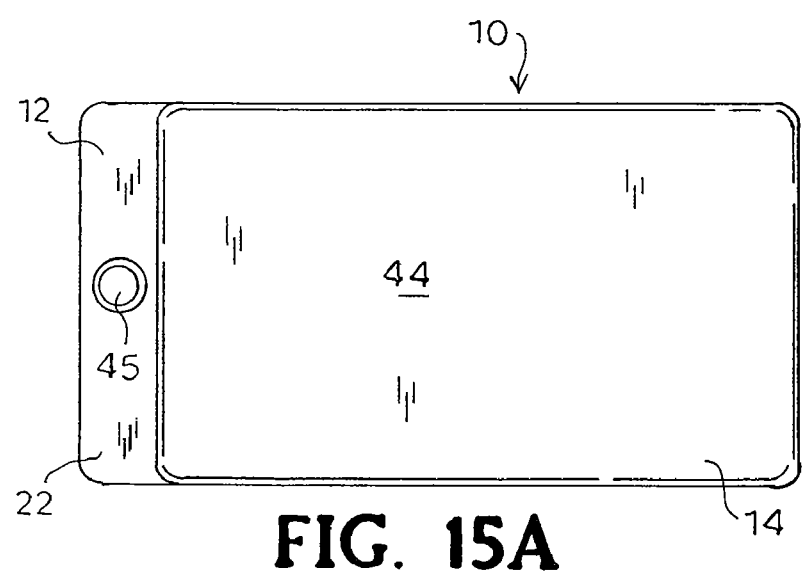
FIG. 15 is a front view of the mobile terminal of FIG. 12.
Figure 13:
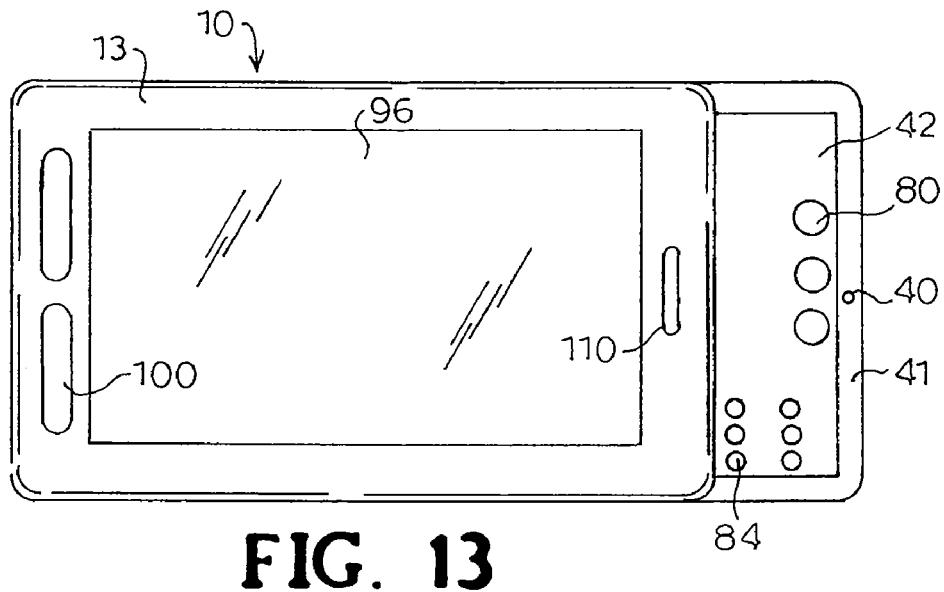
FIG. 13 is a top view of the mobile terminal of FIG. 12.
Figure 14:
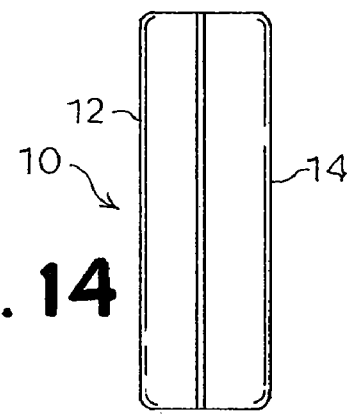
FIG. 14 is a side view of the mobile terminal of FIG. 12.
Figure 15:
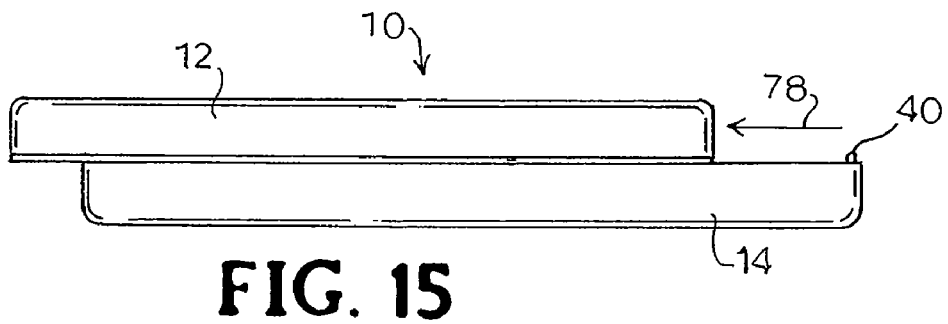
Figure 16:
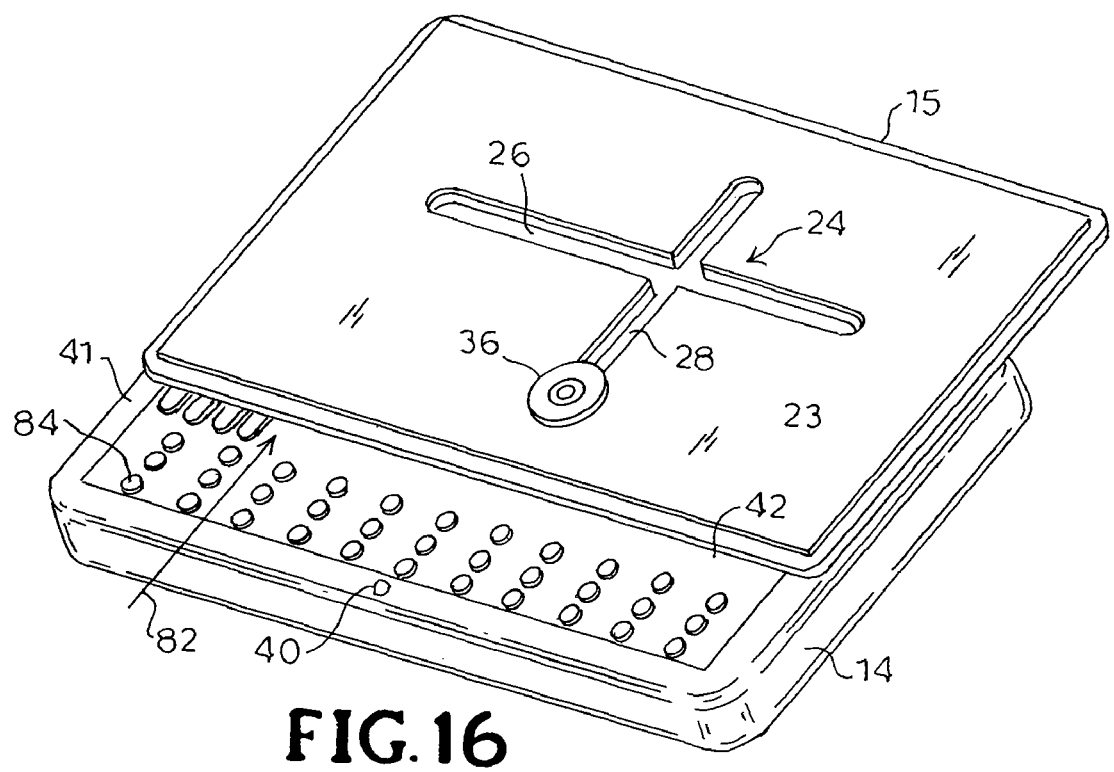
FIG. 16 is a perspective view of the embodiment of FIG. 1 with the lid removed and the first body slid laterally relative to the second body into a fourth position.
Figure 20:
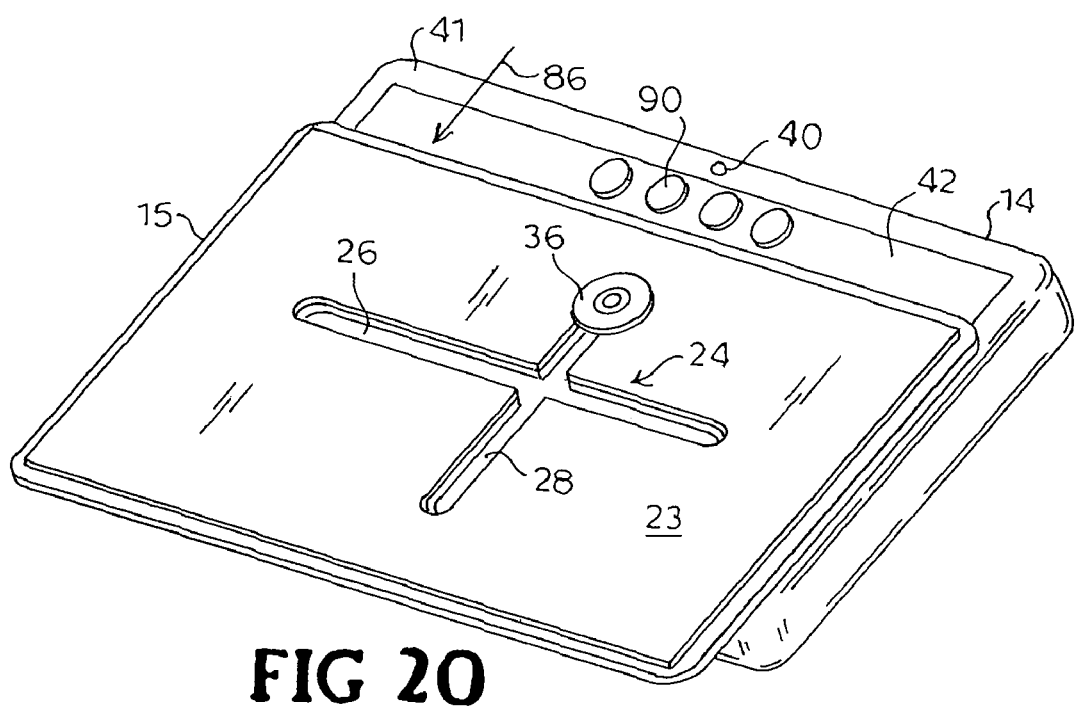
FIG. 20 is a perspective view of the embodiment of FIG. 1 with the lid removed and the first body slid laterally relative to the second body into a fifth position.
Figure 21:
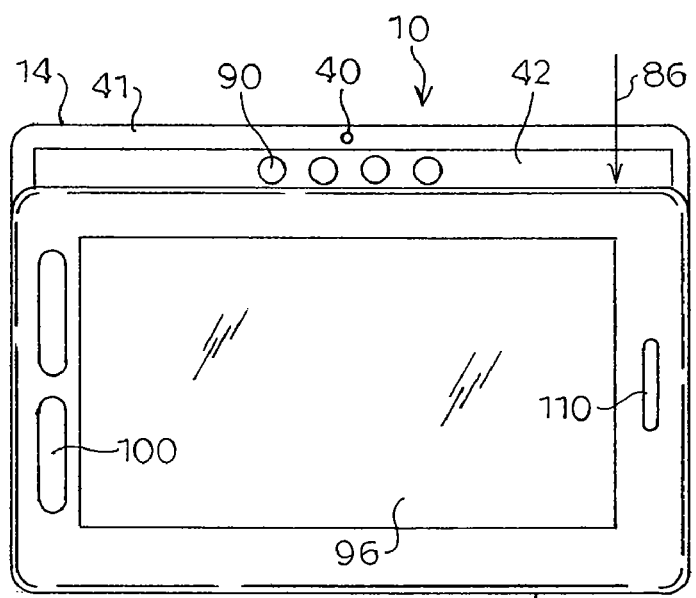
FIG. 21 is a top view of the mobile terminal of FIG. 20.
Figure 22:
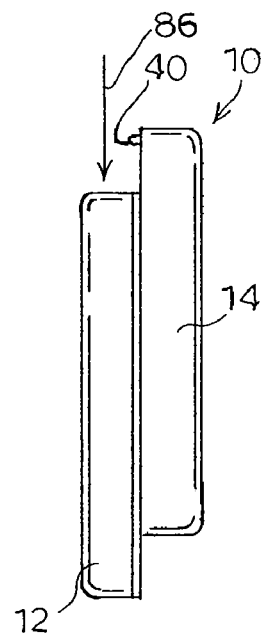
FIG. 22 is a side view of the mobile terminal of FIG. 20.
Figure 23:
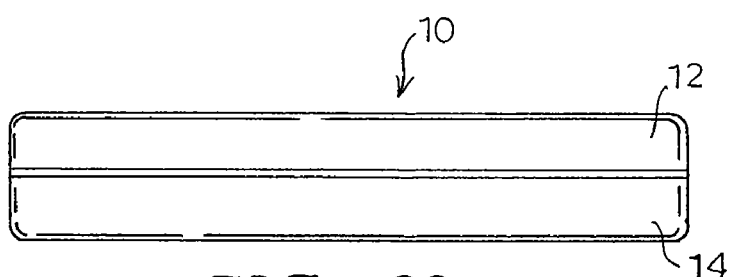
FIG. 23 is a front view of the mobile terminal of FIG. 20.

A second configuration of the present invention is shown in FIGS. 12-15. In this configuration, the first body 12 is slid from the "home" position relative to the second body 14 along the longitudinal grooves 39 as indicated by a second configuration arrow 78. The pins 40, sliding along longitudinal grooves 39, encounter a second longitudinal function recess 66. In this position, a different portion of the upper surface of the main housing 41 is exposed. It is anticipated that second configuration functional buttons 80 may be located in this area. Moreover, in this second configuration, a camera lens 45 is located on the lower surface 22 of the first body 12, as shown in FIG. 15A. When activated in this configuration, the lid touch screen is activated to be used as a view finder. The function buttons 80 are used to perform the functions of a digital camera.

A third configuration of the present invention is shown in FIGS. 16-19. In a third configuration of the invention, the first body 12 is slid relative to the second body 14 in a lateral fashion as indicated by third configuration arrow 82. Prior to the first body 12 being slid relative to the second body 14, the pins 40 are initially at rest within home recesses 43, as shown in FIG. 7. Once the first body 12 begins to slide relative to the second body 14, the pins 40 move out of the home recesses 43 and along the lateral grooves 38. The pins 40 continue to move along the lateral grooves 38 until the come to the first lateral groove recess 76. At this point, the pins 40 are received into first lateral groove functional recesses 76. In this configuration, a portion of the second upper surface 42 of the main housing 41 is exposed. It is anticipated that at least a portion of this surface will contain an alphanumeric keyboard 84 substantially similar to that of a computer keyboard. The upper surface of the lid 13 would include the lid touch screen 96 to display and interact with the user for creating and sending such messages, documents, etc. In this third configuration, it is anticipated that the device will be used as a personal digital assistant (PDA).

A fourth configuration is shown in FIGS. 20-23. In a fourth configuration of the invention, the first body 12 is slid from a "home" position laterally relative to the second body 14 in a direction opposite that described above with respect to the third configuration and as indicated by a fourth configuration arrow 86. During such movement, the pins 40 move from a home recesses 43 to a second lateral groove functional recess 88. At such time, a portion of the upper surface 42 of the main housing 41 is exposed displaying a set of fourth configuration function buttons 90. It is anticipated that these fourth configuration function buttons could be designed to be used in a number of different ways, depending on consumer demands. For example, it is anticipated that such buttons could be designed to be used as functional buttons for use in this configuration as a global positioning system (GPS). In this configuration, the lid touch screen 96 would function as screen. The function buttons 90 would be used to operate the device in this fourth configuration.

Figure 24:
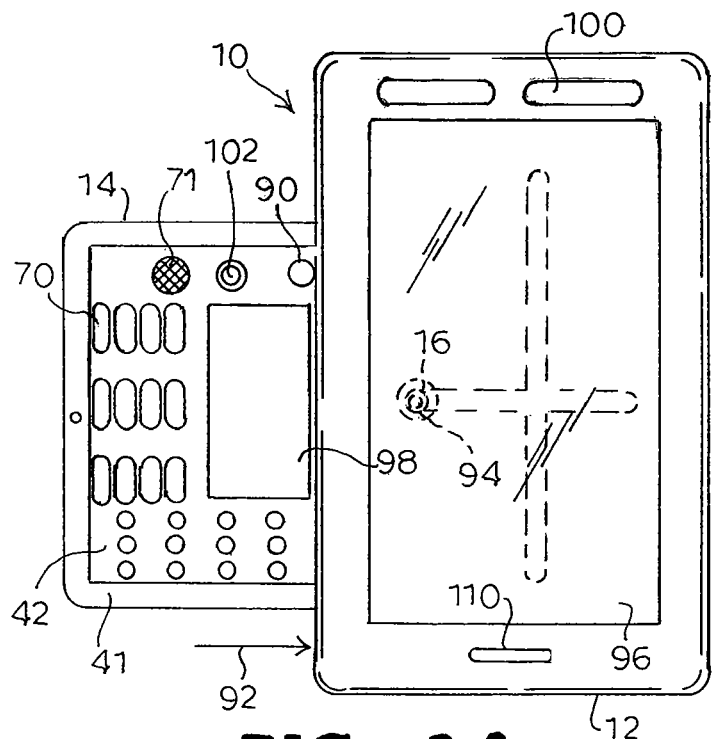
FIG. 24 is a top view of the embodiment of FIG. 1 with the first body pivoted relative to the second body and slid longitudinally relative to the second body into a sixth position.
Figure 25:
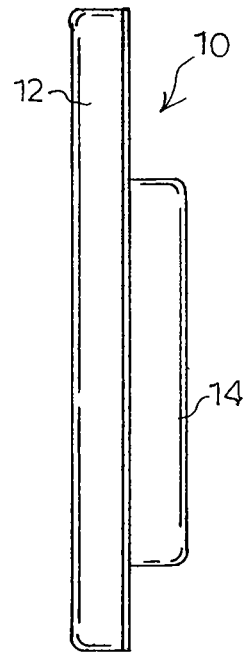
FIG. 25 is a side view of the mobile terminal of FIG. 24.
Figure 26:
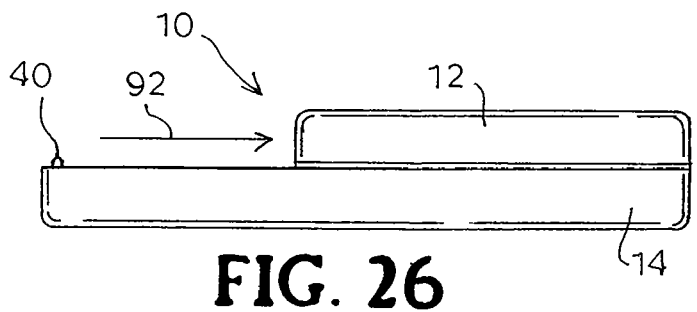
FIG. 26 is a front view of the mobile terminal of FIG. 24.

A fifth configuration is shown in FIGS. 24-26. A fifth configuration is achieved by the user turning the first body 12 relative to the second body 14 from the "home" position so that the first body 12 is relatively perpendicular to the second body 14. This is accomplished by the first body 12 pivoting on the ring assembly 16 which is fixed to the second body 14. This enables the first body 12 to turn relative to the second body 14. Once the first body 12 is approximately perpendicular to the second body 14, the user slides the first body 12 relative to the second body 14 in the direction indicated by fifth configuration arrow 92 until the ring assembly 16 encounters the slot endpoint 94. At this point, the pins 40 are able to recess into the longitudinal grooves 39 at third longitudinal recess 47. It should be noted that in this fifth configuration, the pins 40 on either side of the width of the second body 14 both recede into the same longitudinal groove 39. Thus the third longitudinal recess 47 is located at two points along the length of the same longitudinal groove 39. Once the device is in this fifth configuration, a portion of the second upper surface 42 of the main housing 41 is displayed, as shown in FIG. 25. It is anticipated that elements that will be displayed in this configuration will include a housing touch screen 98, as well as the numeric keypad 70 and microphone 71 and fifth configuration functional elements 100. It is anticipated that at least one of the fifth configuration functional elements will include a second lens 102 so that the device 10 could function as a video conferencing device. In this position, the user would have access to the numeric keypad 70, as well as a view of the lid touch screen 96. The second lens 102 would work to obtain an image of the user and transmit it to the other participating members of the conference. In addition, it is anticipated that the user could view the image taken by the second lens 102 in the housing touch screen 98 located on the second upper surface 42 of the second body 14. The image of the other party or parties participating in the video conference would be displayed on the lid touch screen 96.

A sixth configuration of the present invention is shown in FIGS. 27-30. To obtain this position, the first body 12 is turned relative to the second body 14 as described above with respect to the fifth configuration. However, at that point, the first body 12 is slid relative to the second body 14 along the longitudinal component 26 of the slot 24 to its endpoint. This results in the configuration shown at FIGS. 27 and 30. Here the pin 40 moves from its home recess 43 to a discreet recess 106 located on the lower first surface 22 of the first body 12, shown in FIG. 7. It is anticipated in this sixth configuration, the alphanumeric keyboard 84 will be displayed along with other functional buttons and elements. In this configuration, it is anticipated that the function buttons 80 would operate for use as navigational keys for use in a game context. It is further anticipated that in this sixth configuration, that the lid screen 96 would be illuminated and display the game for the user.

It may be noted that function button 110 in FIG. 27 may be used for a particular configuration. Alternatively, the same space on the device may be occupied by a microphone, speaker or other device as is deemed appropriate by the designers.

It is anticipated that there may be other features that may be included in the invention such as a stylus and stylus holder, receptors for earphones, and the like. The description above with respect to the various configurations is meant as an illustration of the potential uses for the terminal device in the various configurations and is not intended to be a limitation on the potential combinations and permutations of the additional of known features that may be included in such a device.

In addition, it is further anticipated that the terminal device described above may have more than the six configurations herein described. It is anticipated that the groove and recess configuration described and shown in FIG. 7 may have additional recesses thereon to support additional configurations for the terminal device. Such further configurations may be created by the addition of recesses along the lateral 38 or longitudinal grooves 39 or located discreetly on the first lower surface 22.

One of ordinary skill in the handheld communication and electrical device arts will quickly recognize that the invention has other applications in other environments. It will also be understood by someone of ordinary skill in the art that the functionality of mobile terminals may vary widely. In fact, many embodiments and implementations are possible. The following claims are in no way intended to limit the scope of the invention to the specific embodiments described. In addition, the recitation "means for" is intended to evoke a means-plus-function reading of an element in a claim, whereas, any elements that do not specifically use the recitation "means for," are not intended to be read as means-plus-function elements, even if they otherwise include the word "means." It should be understood by those skilled in the art that the foregoing modifications as well as various other changes, omissions and additions may be made without parting from the spirit and scope of the present invention.

What is claimed is:

1. A mobile terminal comprising:
   a first body having a first upper surface and a first lower surface, and having a longitudinal axis and a lateral axis;
   a second body having a second upper surface and a second lower surface; and
   a connector comprising a ring assembly fixed to the second body and rotatably and slidably connected to the first body,
   whereby the first body is capable of slidably moving along the ring assembly along the longitudinal axis relative to the second body,
   whereby the first body is further capable of slidably moving along the ring assembly along the lateral axis relative to the second body, and
   whereby the first body is further capable of rotatably moving about the ring assembly relative to the second body while maintaining electrical communication with the second body.

2. The mobile terminal of claim 1 wherein the first body has a longitudinal slot located thereon.

3. The mobile terminal of claim 1 wherein the first body has a lateral slot located thereon.

4. The mobile terminal of claim 1 wherein the connector comprises a ring assembly fixed to the second body.

5. The mobile terminal of claim 1 wherein the second upper surface contains at least one alphanumeric keypad thereon.

6. The mobile terminal of claim 1 wherein the second upper surface contains at least one touch screen thereon.

7. The mobile terminal of claim 1 wherein the second upper surface contains at least one numeric keypad thereon.

8. The mobile terminal of claim 1 wherein the second upper surface contains at least one camera lens thereon.

9. The mobile terminal of claim 1 wherein the first upper surface of the first body contains a screen thereon.

10. The mobile terminal of claim 1 wherein the second upper surface contains terminal functional buttons thereon.

11. The mobile terminal of claim 4 wherein the ring assembly has a plurality of electrical wires disposed through the center of the ring assembly.

12. The mobile terminal of claim 1 wherein the first body includes a camera lens located on the first lower surface.

13. A mobile terminal comprising: a first body having a first upper surface and first lower surface, and having a longitudinal axis and a lateral axis; a slot located on the first lower surface, the slot having a longitudinal component and a lateral component, the longitudinal and lateral components being relatively perpendicular to each other; a second body having a second upper and a second lower surface; a connector comprising a ring assembly fixed to the second body and slidably received into the slot in the first body for slidable and pivotable engagement therewith, the connector having a hollow central core, electrical wires connected at a first end to the first body and at a second end to the second body, the electrical wires to pass through the hollow central core of the connector; and a pair of spaced apart longitudinal grooves and a pair of space apart lateral grooves, the grooves located on the first lower surface and each having a groove length and at least one recess along the groove length, wherein the groove recesses being made of an electrically conductive material, and the remaining length of the groove being made of a non-conductive material, at least one spring loaded pin mounted on the second upper surface, the pin slidably engaged in at least one groove, and being made of an electrically conductive material; terminal communication means for receiving electrical signals and sending electrical signals within the device; whereby the first body is capable of slidably moving along the ring assembly along the longitudinal axis relative to the second body, whereby the first body is further capable of slidably moving along the ring assembly along the lateral axis relative to the second body, and whereby the first body is further capable of rotatably moving about the ring assembly relative to the second body while maintaining electrical communication with the second body, whereby when the first body moves relative to the second body, the ring assembly moves from a first position within the groove to a second position at a groove recess, the contact of the ring assembly with the electrically conductive groove material at the groove recess creates an electrical signal that sends an electrical signal to the terminal communication means regarding the function to be adopted by the terminal in the assumed position of the terminal.

14. The mobile terminal of claim 13 wherein the second upper surface has a camera lens thereon.

15. The mobile terminal of claim 13 wherein the first upper surface has a screen thereon.

16. The mobile terminal of claim 13 wherein the first lower surface has a camera lens thereon.

17. The mobile terminal of claim 13 wherein the second upper surface has an alphanumeric keypad thereon.

18. The mobile terminal of claim 13 wherein the second upper surface has a numeric keypad thereon.

19. The mobile terminal of claim 13 wherein the second upper surface has a touch screen keypad thereon.

20. The mobile terminal of claim 13 wherein the first lower surface has a camera lens thereon.

21. The mobile terminal of claim 13 wherein when the first body slides relative to the second body in the longitudinal slot in a first direction, at least one pin moves from a first point on the longitudinal groove to a first longitudinal groove recess, signaling to the terminal to assume the function of a cellular telephone.

22. The mobile terminal of claim 13 wherein when the first body slides relative to the second body in the lateral slot, at least one pin moves from a first point on the lateral groove to a first lateral groove recess, signaling to the terminal to assume the function of a personal digital assistant.

23. The mobile terminal of claim 13 further comprising a least one discreet functional recess located on the first lower surface.

24. The mobile terminal of claim 23 wherein when the first body pivots relative to the second body about the connector and then the first body is slid relative to the second body along the longitudinal component of the slot of the first body, at least one pin moves from a first position within the longitudinal groove to a second position received within a first discreet functional recess, signaling to the terminal to assume the function of a cellular video teleconferencing device.

25. The mobile terminal of claim 13 wherein when the first body slides relative to the second body in the longitudinal slot in a second direction, at least one pin moves from a first point on the longitudinal groove to a second longitudinal groove recess, signaling to the terminal to assume the function of a digital camera. 13.

26. The mobile terminal of claim 13 wherein when the first body pivots relative to the second body about the connector and then the first body is slid relative to the second body along the lateral component of the slot of the first body, at least one pin moves from a first position within the longitudinal groove to a second position received within the longitudinal groove at third longitudinal recesses, signaling to the terminal to assume the function of a gaming device.

27. The mobile terminal of claim 13 wherein when the first body slides relative to the second body in the lateral slot, at least one pin moves from a first point on the lateral groove to a second lateral groove recess, signaling to the terminal to assume the function of a global positioning system.

28. A mobile terminal comprising: a first body having a first upper surface and first lower surface, the first upper surface having a screen thereon, the first lower surface having a camera lens thereon, the first body having a longitudinal axis and a lateral axis; a slot located on the first lower surface, the slot having a longitudinal component and a lateral component, the longitudinal and lateral components being relatively perpendicular to each other; a second body having a second upper and a second lower surface, the second upper surface having an alphanumeric keypad, a numeric keypad, a camera lens, a touch screen, and at least one pin recess thereon; a connector comprising a ring assembly fixed to the second body and slidably and rotatably received into the slot in the first body for slidable and pivotable engagement therewith, the connector having a hollow central core, electrical wires connected at a first end to the first body and at a second end to the second body, the electrical wires to pass through the hollow central core of the connector; and a pair of spaced apart longitudinal grooves and a pair of spaced apart lateral grooves, the grooves located on the first lower surface and each having a groove length and at least one groove recess along the groove length, wherein the groove recess is made of an electrically conductive material, and the remaining length of the groove being made of a non- conductive material, and at least one spring loaded pin mounted on the second upper surface, the pin removeably engaged in at least one groove, and being made of an electrically conductive material; whereby the first body is capable of slidably moving along the ring assembly along the longitudinal axis relative to the second body, whereby the first body is further capable of slidably moving along the ring assembly along the lateral axis relative to the second body, and whereby the first body is further capable of rotatably moving about the ring assembly relative to the second body while maintaining electrical communication with the second body, whereby when the first body slides or pivots relative to the second body, at least one pin moves from a first position within the groove to a second position at a groove recess or a pin recess, the contact of the pin with the electrically conductive groove material at the groove recess or pin recess creates an electrical signal that communicates within the terminal to indicate the function to be adopted by the terminal in the assumed position of the terminal.

29. The mobile terminal of claim 28 wherein when the first body slides relative to the second body in the longitudinal slot in a first direction, at least one pin moves from a first position on the longitudinal groove to a first longitudinal groove recess, and the numeric keypad on the second surface is exposed, signaling to the terminal to assume the function of a cellular telephone.

30. The mobile terminal of claim 28 wherein when the first body slides relative to the second body in the longitudinal slot in a second direction, at least one pin moves from a first position on the longitudinal groove to a second longitudinal groove recess signaling to the terminal to assume the function of a digital camera, such longitudinal movement exposes the camera lens on the lower first surface and the function buttons on the upper second surface, and activates the screen on the upper first surface as a camera viewfinder.

31. The mobile terminal of claim 28 wherein when the first body slides relative to the second body in the lateral slot in a first direction, at least one pin moves from a first position on the lateral groove to a first lateral groove recess signaling to the terminal to assume the function of a personal digital assistant, such lateral movement exposes the alphanumeric keypad on the upper second surface, and activates the screen on the upper first surface as a touchscreen.

32. The mobile terminal of claim 28 wherein when the first body slides relative to the second body in the lateral slot in a second direction, at least one pin moves from a first position on the lateral groove to a second lateral groove recess signaling to the terminal to assume the function of a global positioning system, such lateral movement exposes the function buttons on the upper second surface, and activates the screen on the upper first surface.

33. The mobile terminal of claim 28 wherein when the first body pivots relative to the second body about the connector and then the first body is slid in the lateral slot in a first direction to the end of the slot, at least one pin moves from a first position within a longitudinal groove to a second position received within the pin recess, signaling to the terminal to assume the function of a cellular video teleconferencing device, and such pivoting and longitudinal sliding expose the alphanumeric keypad, camera lens and touch screen on the second upper surface and activate the screen on the upper first surface.

34. The mobile terminal of claim 28 wherein when the first body pivots relative to the second body about the connector and then the first body is slid in the lateral slot in a first direction to the end of the slot, at least one pin moves from a first position within a longitudinal groove to a second position received within a third longitudinal groove recess, signaling to the terminal to assume the function of a gaming device, and such pivoting and longitudinal sliding expose the alphanumeric keypad, numeric keypad and function buttons on the second upper surface and activate the screen on the upper first surface.

* * * * *

UNITED STATES PATENT AND TRADEMARK OFFICE
CERTIFICATE OF CORRECTION

| | | |
|---|---|---|
| PATENT NO. | : 7,970,444 B2 | Page 1 of 1 |
| APPLICATION NO. | : 11/679966 | |
| DATED | : June 28, 2011 | |
| INVENTOR(S) | : Curtis W. Thornton, Gerard James Hayes and Ronald A. Louks | |

It is certified that error appears in the above-identified patent and that said Letters Patent is hereby corrected as shown below:

Column 11, line 15, please delete "slidablv" and insert in place thereof --slidably--;

Column 11, line 17, please delete "rotatablv" and insert in place thereof --rotatably--.

Signed and Sealed this
Ninth Day of August, 2011

David J. Kappos
*Director of the United States Patent and Trademark Office*